US006081262A

United States Patent [19]
Gill et al.

[11] Patent Number: 6,081,262
[45] Date of Patent: *Jun. 27, 2000

[54] METHOD AND APPARATUS FOR GENERATING MULTI-MEDIA PRESENTATIONS

[75] Inventors: Timothy Earl Gill, Denver; David Arthur Knoshaug, Aurora; Zachary Tyler Nies, Englewood; Edwin Van Horn Post, Arvada, all of Colo.

[73] Assignee: Quark, Inc., Denver, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/753,982

[22] Filed: Dec. 4, 1996

[51] Int. Cl.$^7$ .................................................. G06T 11/60
[52] U.S. Cl. ........................................... 345/302; 707/517
[58] Field of Search .................................... 345/333, 334, 345/335, 339, 302, 326, 501, 342, 115, 116; 707/500, 513, 526, 517, 530, 109

[56] References Cited

U.S. PATENT DOCUMENTS

| | | | |
|---|---|---|---|
| 4,905,163 | 2/1990 | Garber et al. | 364/513 |
| 5,572,643 | 11/1996 | Judson | 395/793 |
| 5,592,602 | 1/1997 | Edmunds et al. | 395/174 |

OTHER PUBLICATIONS

"Director Multimedia Studio Overview & Key Features" Macromedia Inc. Webpage, updated Nov. 26, 1996.
"About ClickWorks" Pitango Multimedia Ltd Webpage.
"Authorware Interactive Studio Overview & Key Features" Macromedia Inc. Webpage, Updated Nov. 26, 1996.
"HyperCard Version 2.3"Apple Computer, Inc. Webpage, last updated May 2, 1996.
"An Introduction to m Tropolis" m Tropolis, Inc. Webpage.

*Primary Examiner*—Joseph H. Feild
*Assistant Examiner*—Alford W. Kindred
*Attorney, Agent, or Firm*—Duft, Graziano & Forest, P.C.

[57] ABSTRACT

The multi-media presentation generation system combines media objects of multiple diverse types into an integrated multi-media presentation. The resultant multi-media presentation can be defined in an output-independent representation, which the multi-media presentation generation system converts into a representation that is optimized for the destination storage and/or presentation medium selected by the author. The multi-media presentation generation system uses a page based document layout paradigm to regulate the spatial relationships among the plurality of objects contained within the multi-media presentation. The page based document layout system partitions document pages, as defined by the author, into a plurality of objects, each of which is independently editable by the author. A multi-media authoring tool extends the capabilities of the page based document layout system to enable an author to merge both static and dynamic objects in a page layout environment to create the multi-media presentation. The resultant multi-media presentation comprises a static background on which is overlaid a plurality of independently running dynamic objects, which objects may be responsive to the user's input.

32 Claims, 5 Drawing Sheets

METHOD AND APPARATUS FOR GENERATING MULTI-MEDIA PRESENTATIONS

FIELD OF THE INVENTION

This invention pertains to a multi-media presentation generation system that uses a multi-media authoring tool extension of a page based print document layout system to combine media objects of multiple diverse types into an integrated multi-media presentation. The resultant multi-media presentation can be defined in an output-independent representation, which the multi-media presentation generation system converts into a representation that is optimized for the destination storage and/or presentation medium selected by the author.

PROBLEM

It is a problem in the field of multi-media presentation generation systems to efficiently integrate the diverse types of media that are available to an author into a multi-media presentation for publication on an electronic medium. It is a further problem for the author to edit and update the multi-media presentations that are created with such systems.

It is well known in the presentation generation arena how to create multi-media presentations which contain textual, graphical, audio, and even video segments. One type of presently available presentation generation systems is the Director Multimedia Studio, which is available from Macromedia, Inc. This system is "frame based" in that it enables the author to create a sequence of visual images on a frame by frame basis. This system uses a storyboard and timeline paradigm to manage the series of frames which are used to produce the desired visual output. The author must populate each of the individual frames with the selected video, graphical, and textual material. The programming language used in this frame and presentation creation process is a complex script generation language. The author of a presentation must therefore have significant programming skills to craft the scripts required to produce a sophisticated multi-media presentation and precisely regulate its presentation characteristics using the complex programming language. This programming complexity increases the cost and complexity of producing a multi-media presentation and increases the likelihood of flaws in the final product. The author also cannot change an imported multi-media object without having to significantly re-edit and recompile the final multi-media presentation.

Another class of presently available presentation generation systems uses an object based paradigm, rather than the frame based orientation of the Director Multimedia Studio. The ClickWorks™ system, available from Pitango Multimedia Ltd., comprises such a system, and is both object and timeline based. This system uses both event and time metaphors to enable the author to define the multi-media presentation. In the ClickWorks™ system, the author uses templates to assemble the objects and thereby create the viewable screens. The multi-media scripting capability is implemented by means of an Events palette, which is a user interface that enables the author to define the logical events which trigger the presentation actions without the need to write script language code. In addition, a timeline palette provides the author with multiple time scenarios to control self-unfolding screen behavior. However, the author must work on logical and visual abstractions of both objects and the viewable screens on which they appear. The author operates in a programming environment to define the multi-media presentation without being able to view the presentation screen as it is being developed.

Another object based system is the Authorware Interactive Studio, which is available from Macromedia, Inc. This system is object based and uses a logical orientation to control the multi-media presentation. The Authorware Interactive Studio uses an object-oriented interface which uses icons to define and control the multi-media presentation logic. Authors must place icons, which represent the various multi-media objects, on a flowline to create an application, thereby eliminating the need to directly write the script language. The Authorware Interactive Studio converts the author's flowline definition into the necessary script language to control the multi-media presentation. However, the Authorware Interactive Studio is structurally intensive, in that all objects must be merged into a single flowchart. In addition, this environment is not a familiar way for authors to present graphical information and the flowline represents a complex method of controlling the multi-media presentation.

One other object based system is the HyperCard system, which is available from Apple Computer, Inc. This system is an event driven, object based system which uses a logical orientation to control the multi-media presentation. The HyperCard system organizes information into "stacks" of cards through which users navigate and search for the information that they need. The author uses an English-like scripting language to program the control logic which defines the various actions that occur within the multi-media presentation. The HyperCard system then responds to external events, identified by the author, by running the user-defined programs, which contain the scripting language, to execute the control logic. However, it is difficult to author in this system, since it is program language based. In addition, the author must work on logical and visual abstractions of both objects and the viewable screens on which they appear. The author operates in a programming environment to define the multi-media presentation without being able to view the presentation screen as it is being developed.

Another event driven, object based system is the mTropolis system, which is available from mFactory, Inc. This system is object based and also uses a logical orientation to control the multi-media presentation. The mTropolis system is a fully object oriented environment in which objects can be assigned properties and inherit properties from other objects. Objects can also respond to external events. This system uses a natural language form of script language, but it is very complicated and object based. The mTropolis system is not oriented to the visual artist, but is instead programmer oriented. In addition, the author must work on logical and visual abstractions of both objects and the viewable screens on which they appear. The author operates in a programming environment to define the multi-media presentation without being able to view the presentation screen as it is being developed.

In summary, none of these systems are built upon a page based print document layout system paradigm. These systems are multi-media unique, in that they are not related to existing print media document authoring systems nor are they capable of reusing existing print information for multi-media applications. These systems require the author to work in unfamiliar environments, in that they are unlike print based authoring systems and tend to be programmatically complex. The artificial design constraints imposed by these systems on the authors and the need for programming expertise to author in some of these systems are significant limiting factors. These systems require the author to work on logical and visual abstractions of both objects and the viewable screens on which they appear. The author operates in a programming environment to define the multi-media presentation without being able to view the presentation screen as it is being developed.

SOLUTION

The above described problems are solved and a technical advance achieved in the field by the system for generating multi-media presentations of the present invention. This multi-media presentation generation system uses a multi-media authoring tool extension of a page based print document layout system to combine media objects of multiple diverse types into an integrated multi-media presentation. The resultant multi-media presentation can be defined in an output-independent representation, which the multi-media presentation generation system converts into a representation that is optimized for the destination storage and/or presentation medium selected by the author.

The multi-media presentation generation system uses a page based print document layout paradigm to regulate the spatial relationships among the plurality of objects contained within the multi-media presentation. This system is implemented to include a multi-media authoring tool which operates as an extension of a page based print document layout system to encompass dynamic multi-media objects. This system could alternatively be accomplished by wrapping the multi-media authoring tool directly into the page based document layout system, without it having to be an extension. In either case, the familiar print media page layout environment is extended to encompass multi-media presentations.

Page based document layout systems are known for the print medium, and one such system presently available is titled "QuarkXPress," produced and distributed by Quark, Inc. This page based document layout system partitions document pages, as defined by the author, into a plurality of objects (also termed boxes and lines), each of which is independently editable by the author. The page based document layout system coordinates and manages the inputting of data into the plurality of objects and ensures that the populated objects are integrated into the final document page layout. The data that are input into these objects are static in nature, in that the data comprises print data: textual information and/or graphics. These types of data, when combined into the document page layout, represent the final presentation which is static in nature, being comprised of a plurality of static objects. This page based document layout system is menu driven, in that the author simply selects object characteristics from a set of menus to control the layout, content and presentation of the document page that is created. In this manner, the author can simply create a document and precisely regulate its presentation characteristics without the need to use complex programming languages.

The multi-media presentation generation system uses a multi-media authoring tool to extend the capabilities of the page based document layout system to enable an author to merge both static and dynamic objects in the familiar page based layout environment to create the multi-media presentation. The dynamic objects available to the author include, but are not limited to: run time movies, animation, pop-up menus, interactive queries, audio, moving objects, and any other dynamic data that the author desires to include in the multi-media presentation. The selection of the various objects which comprise a page of the final multi-media presentation and the regulation of the object characteristics is accomplished in a menu based authoring environment maintained by the multi-media authoring tool. This system also enables the author to take existing documents prepared for a print medium and convert them to multi-media presentations. Another advantage of implementing the multi-media presentation generation system as an extension to the existing page based document layout system is that the tools and environment available in the page based document layout system are substantially the same tools available in the multi-media environment to layout and manipulate the multi-media presentations.

The multi-media authoring tool assigns a unique identification to each object that has multi-media information and that is located in the multi-media presentation, in the form of hidden information, to distinguish it from all static objects created in the presentation. The hidden information associated with each object defines the unique multi-media characteristics of the images displayed in the object and this hidden information is maintained by but is not necessarily accessed by the page based document layout system. Thus, the multi-media nature of these objects is transparent to the page based document layout system. The multi-media presentation generation system then creates an export object using this hidden information, and identifies the ownership of this object (page, window, no ownership, and the like) by considering the geometry of the object. This geometry information is defined by the page based document layout system, which functions to regulate the spatial relationships among the plurality of objects contained within the multi-media presentation.

Thus, the multi-media presentation generation system uses a multi-media authoring tool extension of a page based print document layout system to combine media objects of multiple diverse types into an integrated multi-media presentation. This system enables the author to take existing documents prepared for a print medium and convert them to multi-media presentations. Another advantage of implementing the multi-media presentation generation system as an extension to the existing page based document layout system is that the tools and environment available in the page based document layout system are substantially the same tools available in the multi-media environment to layout and manipulate the multi-media presentations. This system operates without the complex frame based, script language environment of some prior systems, since it is based on a desktop publishing environment. There is also no need for programming expertise to author multi-media presentations. This system does not require the author to work on logical and visual abstractions of both objects and the viewable screens on which they appear. Thus, the multi-media presentation generation system of the present invention overcomes the limitations of the existing multi-media authoring systems.

BRIEF DESCRIPTION OF THE INVENTION

DETAILED DESCRIPTION

Basic System Architecture

Figure 1:
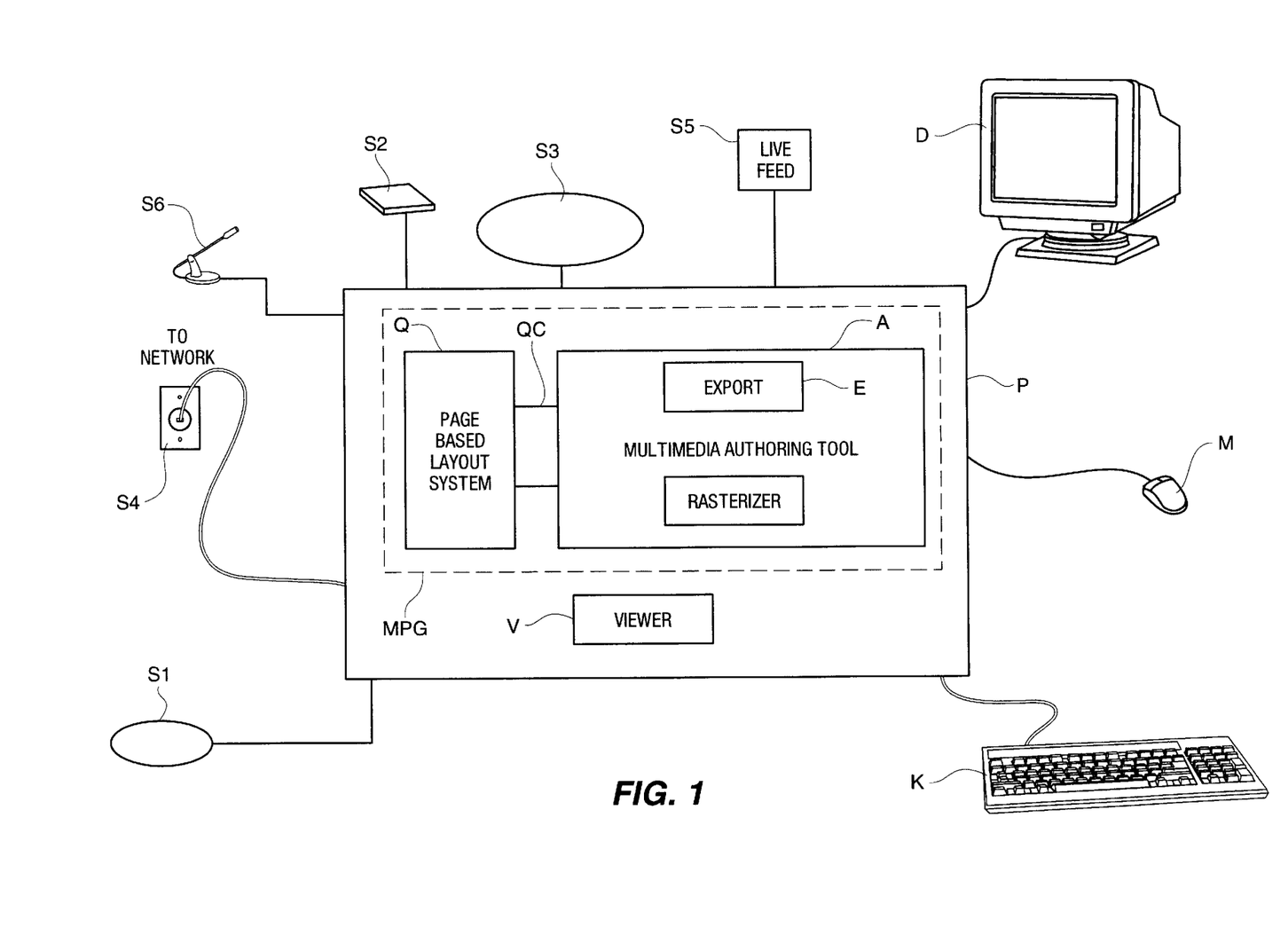
FIG. 1 illustrates, in block diagram form, the overall architecture of a preferred embodiment of the multi-media presentation generation system of the present invention.

FIG. 1 illustrates, in block diagram form, an architectural diagram of the preferred embodiment of the multi-media presentation generation system of the present invention. The multi-media presentation generation system comprises a menu driven multi-media presentation generation system MPG, executing on a processor P, which accesses data from any of a multitude of media sources S1–S6, which data is in any of a multitude of formats and contents for integration into an adaptable product which represents the multi-media presentation. The basic architecture of the multi-media presentation generation system is a multi-media authoring tool which operates in conjunction with a page based document layout system to extend the menu based, static object manipulation capability of the page based document layout system to encompass dynamic multi-media objects.

One element of this multi-media presentation generation system MPG comprises a page based document layout system Q which functions to define the basic workspace for the user into which the plurality of media objects are imported. In particular, the page based document layout system Q includes a page layout capability which enables the user to define a workspace of predetermined physical extent, generally in a two dimensional mode, which workspace is divided by the user into a plurality of objects. Each of these objects comprise a segment of the workspace and do not have extents that project beyond the boundaries of the workspace. The plurality of objects in the workspace are either disjunct, or overlap or are physically contiguous within the workspace. The user defines the content and function of each of these workspaces individually as well as their integration with the other objects in the workspace to form the entirety of the presentation.

The multi-media presentation generation system MPG also comprises a software extension feature QC which functions to interconnect the page based document layout system Q with at least one source of media objects S1–S6 and with a multi-media authoring tool A. The multi-media authoring tool A is interconnected with the page based document layout system Q via the existing published interfaces of the software extension feature QC of the page based document layout system Q. This system could alternatively be accomplished by wrapping the multi-media authoring tool A directly into the page based document layout system Q, without it having to be an extension. In either case, the multi-media authoring tool A operates in conjunction with the page based document layout system Q to extend the menu based, static object manipulation capability of the page based document layout system Q to encompass dynamic multi-media objects. The dynamic objects each comprise viewable data which is presented pursuant to a set of parameters, which regulate the generation and presentation of the resultant images independent of the other objects which comprise the multi-media presentation. These dynamic objects produce their images in their defined extent without requiring the regeneration of the remainder of the presentation image.

The sources of media objects S1–S6 are graphics downloaded from external sources, such as CD-ROM S1 or disk drive S2, graphics generated by additional software resident on the processor P or graphics that are scanned into the system via a peripheral device. Furthermore, video information likewise is obtained from a plurality of external sources including, but not limited to, data communication connections to broadcast media, such as Internet S4 or broadcast television, video tape recorders S3, or live feeds S5 from a camera or other such appropriate source of video information. Audio information is input to the multi-media presentation generation system MPG via microphone S6, radio receiver, data communications source S4 or any similar audio source of data. The textual information is directly input by the user into the page based document layout system Q or is obtained from a word processor or from a data communication source S4 or a peripheral device, such as a document scanner. The above-noted data also includes audio/video files and still images. These types of media and the media sources are simply noted herein to indicate the diversity of information which is used by the multi-media presentation generation system MPG to perform the multi-media object creation.

Underlying Page Based Document Layout System

The underlying page based document layout system is a menu based system which functions to partition document pages, as defined by the author, into a plurality of objects (also termed boxes), each of which is independently editable by the author. The page based document layout system coordinates and manages the inputting of data into the plurality of objects and ensures that the populated objects are integrated into the final document page layout.

For the purpose of illustration, the page based document layout system Q illustrated in FIG. 1 is the commercially available QuarkXPress product. QuarkXPress is document publishing software which is used to create a publication in a print medium. The QuarkXPress system enables a designer to plan and design a print publication. The designer selects the page size, margin widths, number of columns, type faces, type styles, color, and the like. This system includes word processing capability to enable an editor and/or writer to cut, copy, paste and delete text. The graphic artists use this system to create the illustrations, photographs and other graphic elements which accompany the text. The system imports scanned static pictures and computer generated graphics. These various static elements are combined via page layout features, including the use of templates, to enable a created page format to be used repeatedly on various documents. Typographic polishing is available to precisely adjust word and character spacing, hyphenation and justification. Imported pictures are framed, rotated, skewed, resized cropped, and the like. Background color is available as well as text run around capability to wrap text around pictures and illustrations.

Figure 3:
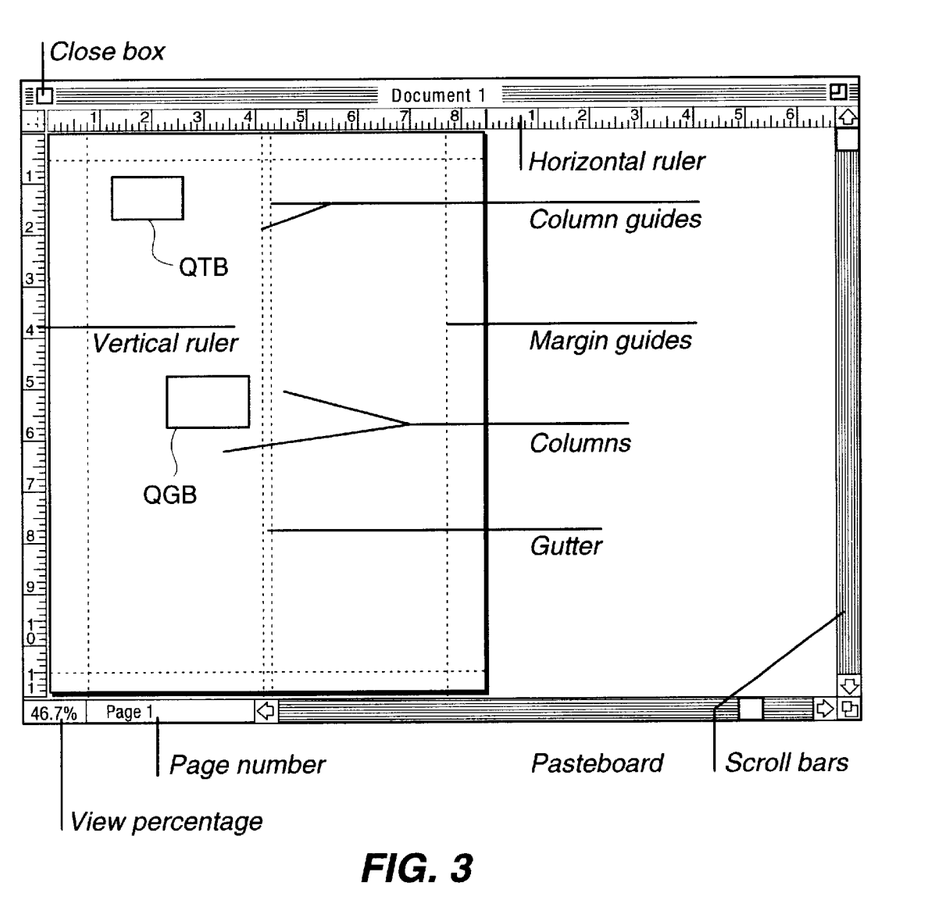
FIG. 3 illustrates a document window created in the QuarkXPress system, with the various elements displayed therein labeled.

Once the user opens a QuarkXPress document, the display represented in FIG. 3, is presented on the user's display screen. The top of the document page is delimited by a title bar which contains an entry field which denotes the name assigned to this document. The user clicks on the title bar and move the entire document page around the display screen. The title bar includes a close box which enables the user to click on this icon to close the document. A zoom box is included in the title bar to enable the user to click on this icon and either enlarge this document page to full screen size or reduce the document page to its previous size. The right hand side of the document page is delimited by a scroll bar which includes upward pointing and downward pointing scroll direction arrows, as well as a scroll box which the user moves in a vertical direction to browse through the document. The bottom of the scroll bar includes a size box which the user activates by clicking on the icon and dragging the selected point on the display screen to thereby resize the document window. The footer bar delimits the bottom of the document page and includes a field which displays data indicative of the magnification or reduction of the page view. A page number indicator field is juxtaposed to the view percent field to indicate the number of the presently displayed page in the document. The left side of the document page is delimited by a vertical ruler and a horizontal ruler is juxtaposed to the title bar and placed directly below the title bar to provide the user with position measurements of elements contained in the document.

The page based document layout system Q displays both a document page and a pasteboard within the confines of the delimiter bars noted above. The document page includes a plurality of page guide lines, which are lines that indicate a page's margins and columns. The pasteboard is a work area which is juxtaposed to the document page. The pasteboard functions as a work area and as a temporary storage area. In the QuarkXPress system, the user creates objects on the pasteboard, then click on the object and drag it into the document page which is displayed juxtaposed to the pasteboard area.

Given this page based document paradigm, the QuarkXPress page based document layout system Q utilizes boxes and lines to manage the document space. The multi-media authoring tool A also uses the boxes and lines of the page based document layout system Q, but for multi-media content, with the hidden information which defines the multi-media content and attributes of these boxes and lines being stored therein to distinguish the multi-media objects. Therefore, the term "object" as used herein encompasses the boxes, lines and the like, whether or not their content is multi-media in nature. The objects comprise the user definable space into which the viewable content is placed for incorporation into the document. The objects have both a position (locus) on the document page and an extent in the two dimensional space of the document page. In particular, text is contained in text objects QTB while pictures are contained in picture objects QGB. Therefore, to place text in a particular location on the document page, a text object QTB must be created at this site. Text objects QTB and picture objects QGB are the basic building blocks of a document. When an object is active, the user modifies it using the controls listed in the text object QTB specifications or picture object QGB specifications. The text objects QTB, picture objects QGB and lines on a QuarkXPress page behave in much the same way as the halftones, galleys of type and press-on rules used in traditional production environments: each item is either in front of or behind other items. The "stacking order" is a term which refers to the front/back relationships among the various items of a page layout. An object that is in front of another item obscures the item behind unless the object has a background color of "none" which renders the object transparent, except for its contents. The multi-media authoring tool A uses these properties of objects, managed by the page based document layout system Q, to author the multi-media presentation. A plurality of menus are provided to enable the user to edit and manage the document, its various pages and the objects that are created for placement thereon. Each menu displays entries which are grouped according to the operation that they perform.

Extensions To The Page Based Document Layout System

QuarkXPress has an open architecture that enables a developer to add new functions and features to the basic page based document layout system Q. This function and feature addition is accomplished by use of the paradigm known as extension software QC, which is an interface which incorporates extension modules, each written using a standard set of instructions, into the underlying page based document layout system Q. The extension module is treated as part of the basic page based document layout system Q, since it is written using the predefined set of program instructions and is formatted to be compatible with the page based document layout system Q. As with any instruction set, there are standard definitions of the functions, the return types, parameter types, data structures and the like. The page based document layout system Q, upon being launched, opens the extension modules in its home folder and passes opcodes to the extension modules to provide an indication of the present state of the processor. The extension modules review the received opcodes to determine whether they represent a stimulus to which this specific extension module is programmed to respond. If so, the extension module performs the programmed action(s). Multiple extension modules are capable of being operational on the same processor and also operate on the same document which is created.

The multi-media presentation generation system MPG is implemented as the addition of at least one extension module (such as multi-media authoring tool A) to the page based document layout system Q. This multi-media authoring tool A makes use of the features and capabilities of the page based document layout system Q and adds multi-media capabilities to these features. One advantage of implementing the multi-media presentation generation system MPG as an extension to the existing page based document layout system Q is that users who are familiar with the tools available in the page based document layout system Q use the same tools in the multi-media environment to layout and manipulate the multi-media presentations. In addition, the capabilities of the page based document layout system Q are available to the user, including, but not limited to: precise placement of objects, grouping of objects, master pages, control of all aspects of text manipulation, use and control of color, and the like. Furthermore, this system enables the author to take existing documents prepared for a print medium and convert them to multi-media presentations.

The expansion of the various objects of the page based document layout system Q by means of the extension software QC results in documents becoming multi-media presentations, with document pages corresponding to multi-media display screens. In addition, the QuarkXPress objects (text and picture objects, lines, and the like) of the page based document layout system Q become multi-media objects, such as: buttons, hot areas, text objects, movies, animations, pop-up menus, windows and the like. The text becomes "hot text" that performs a desired action when the user positions the cursor on the hot text and clicks the mouse. Thus, the multi-media presentation generation system MPG is an extension to the existing page based document layout system Q which expands the static elements of the page based print environment to dynamic elements of the multi-media environment. In addition, the multi-media presentation generation system MPG is itself extensible to enable developers to add features to the basic program in a manner analogous to the extension capability of the page based document layout system Q.

System Operation For Multi-Media Presentation Creation

Figure 2:
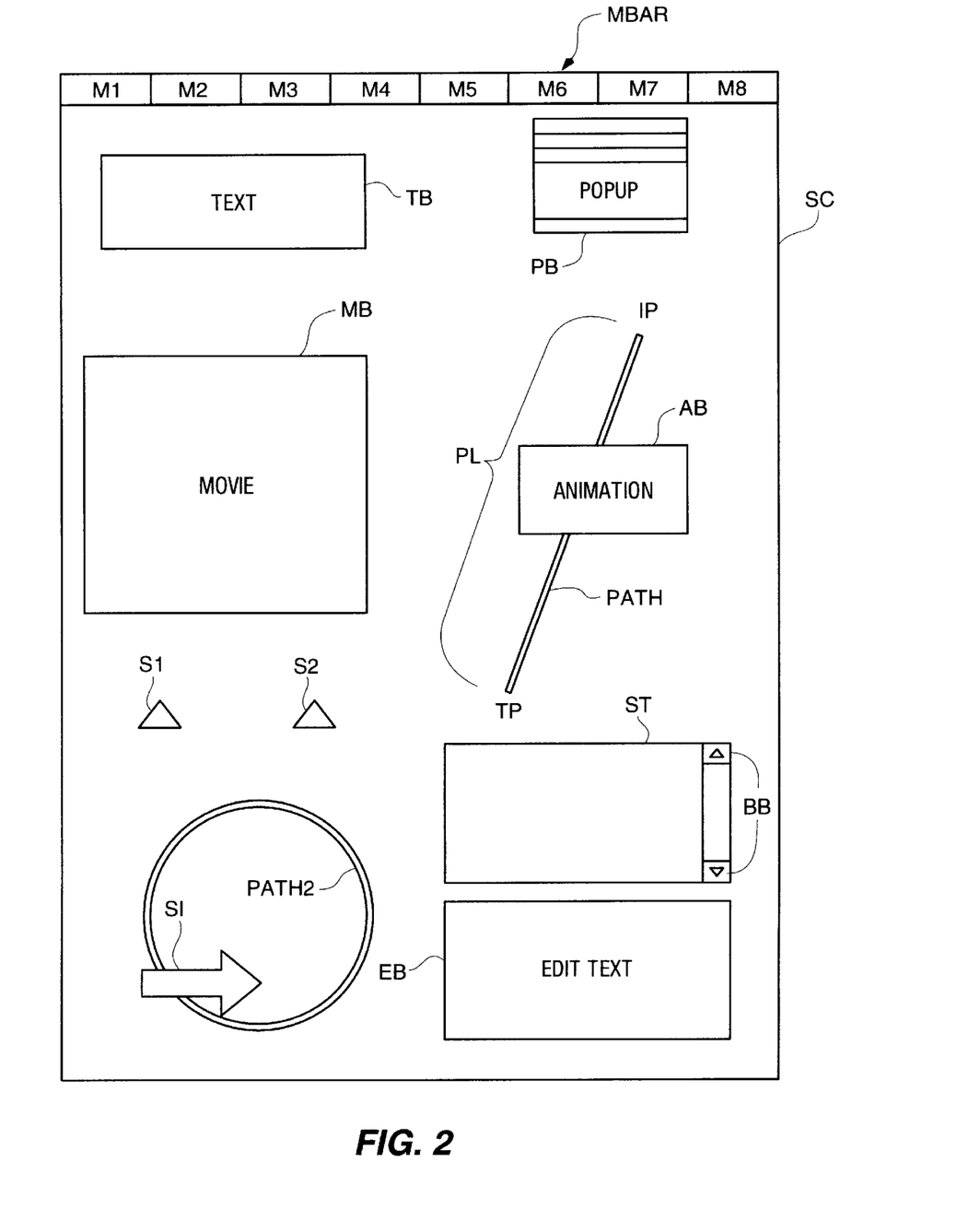
FIG. 2 illustrates a typical multi-media document window which is created using the multi-media presentation generation system of the present invention.

In operation, the user typically interacts with the multi-media presentation generation system MPG by means of a keyboard K and/or a mouse M or other such user input device. The example of the system operation used herein is the authoring of a new multi-media presentation, a page of which is shown in FIG. 2. In particular, as shown in flow diagram form in FIG. 5, the user activates the multi-media presentation generation system MPG at step 501 and is provided with a prompt to thereby enable the user to define a baseline point of reference, such as a page layout. In step 502, the user specifies the extent of the workspace which represents the final image that is produced for the end user. The multi-media authoring tool A of the multi-media presentation generation system MPG displays the queries on the display device D that is part of the system to enable the user the view the prompts from the multi-media presentation generation system MPG and respond thereto by inputting data via the keyboard K and/or mouse M. The user thereby defines the basic parameters with which the multi-media presentation generation system MPG must work. In a typical application, the designer defines a presentation display device D of certain size and characteristics. The designer therefore defines the page layout to comprise the physical extent of a display device, which has certain technical characteristics such as color, resolution, etc. Once the user has defined the basic page extent, the multi-media authoring tool A prompts the user at step 503 to define the plurality of regions (objects) within the workspace into which various objects are to be inserted.

Figure 5:
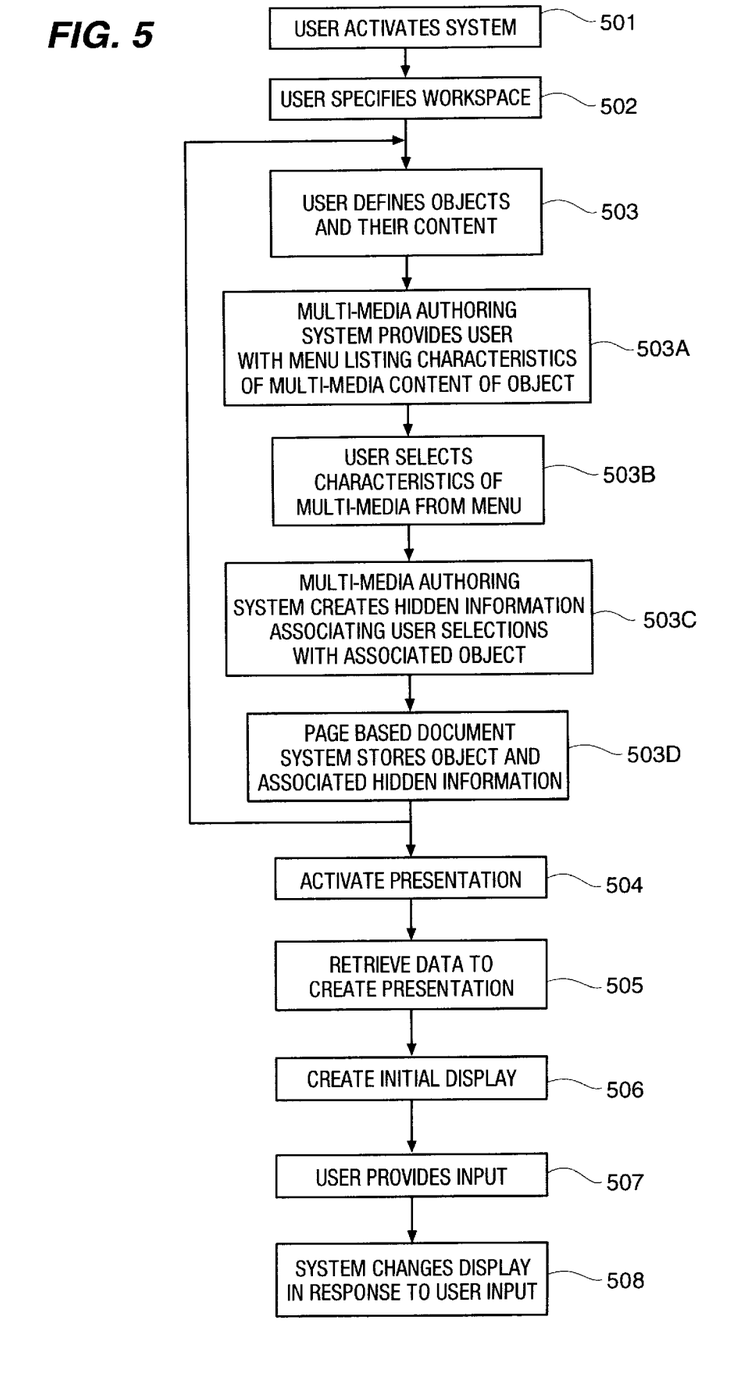
FIG. 5 illustrates, in flow diagram form, the operation of the multi-media presentation generation system in creating and viewing a multi-media presentation.

The multi-media authoring tool A at step 503A provides the user with a set of menus via the display device D to enable the user at step 503B to define the number and physical extent of the regions within the workspace. In defining the regions of the workspace, the user is not constrained to select a single media type for use in that region but can have multiple concurrently active media types within a single workspace and within a single region of the workspace to thereby enable a plurality of multi-media presentations to concurrently be extant on the users display. Since the underlying document layout system Q is page based, the definition of the workspace is described herein in terms of a page and portions of a page to thereby simplify the understanding of the invention. However, there is no inherent limitation in the architecture of the multi-media presentation generation system MPG that requires limitation of the invention to a physical page of information or a print medium which typically is implied by the use of the word "page." Indeed, given that the end product is multi-media in nature, the output can be destined for a display medium that is print in nature or audiovisual or multi-media, in the form of a computer display. Regardless of the form of the display medium, the multi-media authoring tool A functions to automatically integrate a plurality of source modules into a dynamic presentation with the objects used to populate the presentation screen being independent of yet integrally coupled to the page based document layout system Q via the connection software QC.

Typical Multi-Media Page Layout

FIG. 2 illustrates a typical multi-media page layout that is created using the multi-media presentation generation system MPG. This page layout is selected to illustrate some of the features and capabilities of the underlying system. In particular, multiple objects are placed on a page, with these objects having different characteristics. Object types that are supported by this system include but are not limited to: windows; movies; animation; edit text/list; pop-ups (menus); buttons; hot areas; QuarkXPress objects.

The page illustrated in FIG. 2 presents a number of these objects and, for example, include a text object TB, which provides the author with an extent into which are placed textual information that is presented to the viewer in the course of running the presentation. The text is directly input to the text object TB via placing the cursor in the text object TB and using the keyboard KB to input the desired text information. Alternatively the author creates the textual information elsewhere and simply import the text into text object TB, controlling the size, font, format and characteristics of the text via the menu selections available to the user via the multi-media authoring tool A.

Similarly, the author defines a movie object MB into which is imported a movie, which is stored in memory, and obtained from one of the sources named above. Various control objects are also included in the page, such as the control or scrolling arrows BB for a file view object ST, and selection buttons S1, S1. These items are each separate objects which are defined and placed by the author using the menu selections that are provided by the multi-media authoring tool A. Audio is provided as either one of the media objects, such as selection button S1, or as part of one of the other multi-media objects in FIG. 2. The author also defines a path PL which has an initiation point IP and a terminating point TP, which path PL is of arbitrary extent, length and geometry. A linear path is illustrated for simplicity. The path PL represents a motion definition for a object having some content, which object is tied to the path. For illustration, an animation object AB is shown, which animation object contains some generated animation which runs in the extent of the object defined for the animation object AB as the animation object traverses the length of the path PL from the initiation point IP to the terminating point TP. In addition, a closed path PATH2 is illustrated as defining a route for a still image S1.

Another object shown in FIG. 2 is a menu bar MBAR which contains a plurality of menu entries M1–M8. When the user selects one of the menu entries, such as M7, the pop-up menu PB associated with menu entry M7 is displayed in a predetermined position on the display screen. Different menu entries cause the display of different pop-up menus in predetermined locations on the display and multiple pop-up menus are concurrently active on the display screen.

Any arbitrary actions can be associated with an object and all action items are movable. It is of importance to note that the operation of the various objects contained in this page are independent and asynchronous. In particular, the animation object AB runs the animation presentation as defined by the author for that object, without knowledge of or association with any other object in the page. Similarly, the movie operational in movie object MB runs according to its own author defined parameters. The path PATH has its own metrics of speed of traversal, repetitiveness of the motion. These characteristics are predefined by the author, or the user may have the ability to control the activity on the screen display produced. In particular, the movie may not run until the user clicks on the control button S1 to start the movie and clicks on the button S2 to stop the movie. Finally, the editable object EB is provided to enable the user to input text into this object for retention or transmission to another destination.

Implementation of Various Multi-Media Objects

The numerous multi-media objects that are created, edited and manipulated by the operation of the multi-media authoring tool A are described in more detail below in Appendix A which comprises the user's manual for the multi-media authoring tool A. This document is titled "XPloring Quarkimmedia" and discloses the processes used by the multi-media presentation generation system MPG to create and manage the multi-media presentations. The following description notes the effects of the user selecting various objects in this system. In this description, the menu paradigm includes the palette which is produced by the multi-media presentation generation system MPG, and described in Appendix A. This palette consists of several panels, a number of which are described below.

Page Panel—When the user of the multi-media presentation generation system MPG selects the Page panel of the palette and specifies the display and action specifics of this element, the page definition data is transmitted from the multi-media authoring tool A to the page based document layout system Q, where the page definition data is stored inside the QuarkXPress page. The multi-media authoring tool A retrieves this stored page definition data for display and editing by the user. The page definition data is also retrieved from storage when the multi-media presentation is activated or exported, with this data being used to define the multi-media presentation as is described in additional detail below.

Object Panel—When the user of the multi-media presentation generation system MPG selects the Object panel of the palette and specifies the display and action specifics of this element, the object definition data is transmitted from the multi-media authoring tool A to the page based document layout system Q, where the object definition data is stored inside a corresponding QuarkXPress object. The multi-media authoring tool A retrieves this stored object definition data for display and editing by the user. The object definition data is also retrieved from storage when the multi-media presentation is activated or exported, with this data being used to define the multi-media presentation. There are typically limitations on the object definitions which represent constraints of the system. For example, a text object is used to implement multi-media objects which include: basic, animation (item on a path), pop-up menu, text object and window. A picture object is used to implement multi-media objects which include: basic, animation (any kind), movie, pop-up menu and window, while a line is used to implement multi-media objects which include: basic, animation (item on a path). Furthermore, button objects are created through a button library pixel editor which is resident in the multi-media authoring tool A and are similar to picture objects in the page based document layout system Q.

Script Panel—When the user of the multi-media presentation generation system MPG selects the Script panel of the palette and specifies the display and action specifics of this element, the script definition data is transmitted from the multi-media authoring tool A to the page based document layout system Q, where the script definition data is stored inside the QuarkXPress document. The multi-media authoring tool A retrieves this stored script definition data for display and editing by the user. The script definition data is also retrieved from storage when the multi-media presentation is activated or exported, with this data being used to define the multi-media presentation. The script definition data is saved to a file and also loaded into the multi-media presentation from a file.

Hot Text Panel—When the user of the multi-media presentation generation system MPG selects the Hot Text panel of the palette and specifies the display and action specifics of this element, the hot text definition data is transmitted from the multi-media authoring tool A to the page based document layout system Q, where the hot text definition data is stored inside the corresponding QuarkXPress text element. The multi-media authoring tool A retrieves this stored hot text definition data for display and editing by the user. The hot text definition data is also retrieved from storage when the multi-media presentation is activated or exported, with this data being used to define the multi-media presentation. In addition, hidden text marker characters are placed at the beginning and end of the text selection range of the text to delineate the hot text object. Additional hidden text is stored within the range defined by these delimiters to describe the user events and actions that are associated with this hot text item. This additional text is typically stored immediately following the beginning marker character.

Keys Panel—When the user of the multi-media presentation generation system MPG selects the Keys panel of the palette and specifies a key command, the key and script data is transmitted from the multi-media authoring tool A to the page based document layout system Q, where the keys definition data is stored inside the corresponding QuarkXPress page or master page. The multi-media authoring tool A retrieves this stored keys definition data for display and editing by the user. The keys definition data is also retrieved from storage when the multi-media presentation is activated or exported, with this data being used to define the multi-media presentation.

Referenced Files—The multi-media presentation generation system MPG references other files which reside outside of the boundaries of the multi-media presentation generation system MPG and the multi-media presentation which is generated by this system. These referenced files are any of a number of types of files, stored in various locations, which include, but are not limited to: sounds, QuickTime™ movies, animations, cursors, index files, other multi-media presentations, EPS files, AppleScrip™ files. Reference information for these files is transmitted from the multi-media authoring tool A to the page based document layout system Q, where the reference data is stored inside the corresponding QuarkXPress document. The multi-media authoring tool A retrieves this stored reference data for display and editing by the user. The reference data is also retrieved from storage when the multi-media presentation is activated or exported, with this data being used to define the multi-media presentation.

Authoring In the Multi-Media Authoring Tool

The multi-media authoring tool A extends the features and capabilities of the underlying page based document layout system Q to address the multi-media objects used by the multi-media authoring tool A. In particular, the menu capability of the underlying page based document layout system Q is expanded by the multi-media authoring tool A (as shown in Appendix A) to include menus which list the multiple types of media that are available from the media sources S1–S6 as well as the editable and presentation characteristics associated with each media type. The underlying page based document layout system Q is equipped with standard well-defined interfaces, via the extension software QC, which enable the multi-media authoring tool A to integrate its features and user interfaces with the underlying page based document layout system Q.

The multi-media authoring tool A, as part of the creation of the display types illustrated in FIG. 2, creates at step 503C QuarkXPress documents with additional information appended thereto, termed "hidden information," which additional information relates to the objects placed on the pages of the multi-media presentation. The multi-media authoring tool A sometimes places a header on the created page, which header uniquely identifies the page as part of a multi-media presentation. In addition, each object with multi-media information that is created and located on the identified page is assigned a unique identification to distinguish it from all other objects created in the system. The hidden information associated with each multi-media object contains data which defines the unique multi-media characteristics of the presentation displayed in the object and this hidden information is not accessed by the page based document layout system Q. Thus, the multi-media nature of these objects is transparent to the page based document layout system Q and yet these objects are managed by the page based document layout system Q at step 503D using its existing page layout capabilities.

Rasterization

Rasterization consists of the well-known process of converting presentation data into a representation which is usable by the user's display device. Typically, this process converts a geometric representation of an object and it's content into a pixilated image representation.

In the multi-media presentation described herein, some object types that are created and placed on a multi-media page are, of necessity, defined as static, but the remaining objects on a page are processed by the multi-media authoring tool A to analyze the actions which have been defined by the author to see if any action relates to this object. The multi-media authoring tool A differentiates between the static elements located on a page and the dynamic presentation items. The multi-media authoring tool A selects the static or immutable pieces of the display (such as the page background and text object TB in FIG. 2) and makes these items part of the page base image. This is accomplished by combining all of the static elements into a composite element which represents the base page image on which the dynamic objects are placed and operate. The multi-media authoring tool A automatically rasterizes the composite static element of the multi-media presentation page to create a bit mapped display. The multi-media authoring tool A separately rasterizes each of the dynamic images. Each element has layering characteristics and maintains a priority with respect to other objects extant on the page as the object is moved about the page. All objects which contain "special" content, such as content which is not placeable by the existing page based document layout system Q, are considered "dynamic." Examples of such content include, but are not limited to: movies, animation, multi-state buttons, pop-up menus, windows, movable objects, and editable/scrollable text. In addition, a static or basic object, which is placeable by the existing page based document layout system Q, is converted to a dynamic object so that it is not rasterized as part of the background image. These manipulations include, but are not limited to: Show, Hide, Set Position, Slide, Initially Hidden, Initially At Top/Left/Right/Bottom. The first four of these manipulations are actions, while the remaining manipulations are states. Any of these manipulations, when applied to an otherwise static object, makes the object dynamic.

Presentation Timing and Control

The basic page based document layout program Q creates the object and page layout geometry information, which determines the layering for the plurality of objects on a page and animation paths for any movable objects. This layering of objects is also known as Z ordering or Z buffering. The objects which include movies are managed via the Quick-Time™ process of the page based layout program Q which automatically maps movies to the allocated space defined for this object and reformats the movie to fit the selected space. Each run time item, in the form of movies, animation, paths and the like, is independent of the other run time items on the page so there is no need to input timing into the system. The operation of all of the run time items is coordinated by the multi-media authoring tool A in response to programmed actions or the events stimulated by the viewer's actions.

Presentation Export

The multi-media authoring tool A automatically creates different representations for exporting multi-media presentations that are created by the author as a function of the characteristics of the destination storage/presentation medium. These exported multi-media presentations are non-editable files, which are used by the user activating a viewer V to manage and view the multi-media presentation.

For example, in an Internet environment, the multi-media presentation is divided into its many component parts and information is downloaded to the user only as it is needed by streaming the objects to the destination via communication link S4, instead of downloading the entire presentation at once, with the associated delay in user access time. The multi-media authoring tool A exports only the objects and scripts, not a sequence of frames as in the systems of the prior art. The first object transmitted is information bookkeeping and a copy of the viewer process V which enables the user to run the presentation on their native operating system. Thus, the viewer V translates the multi-media presentation data into the images for display on the user's display device.

The presentation information required to create a specific page of the presentation is likely to be placed in a single external export file or a set of external export files. The external export files typically contain a plurality of export objects and associated information, with the external export files representing the decomposition of a presentation page into increments which are separately transmitted to the end user over the communication medium in a timewise efficient manner, yet also does not require the transfer of too many files. When the presentation is opened, there is some overhead information that is transmitted to the user to activate the presentation. The multi-media authoring tool A transmits nonpage limited objects separately, so that they are available to the viewer V to display to the user as the user traverses the presentation. The multi-media authoring tool A exports a multi-media presentation page and then transmits additional pages of the multi-media presentation to enable these successive pages to be available to the user immediately without having to wait for their transmission as in present systems.

Look Ahead Cache

The viewer V look ahead caches a plurality of pages of the multi-media presentation by storing the various elements which comprise a page as well as the page layout information. There are a number of factors which are considered in the look ahead cache implementation. These factors relate to the presentation content, capacity of the transmission medium, capabilities of the user's display device, the user's pattern of presentation viewing, the interrelation of the various objects contained within the multi-media presentation, and the like.

In particular, the look ahead cache process is preferably executed as a background process to thereby minimize the impact on the performance of the user's processor and display device. Therefore, if the user is presently active, interacting with the presently displayed "page" of the multi-media presentation or a high CPU demand media, such as, but not limited to animation or movies is being run on the display, the look ahead cache process is typically inactive. The various other factors are preferably considered in a weighted manner, with the specific factors and their associated weighting values being determined by the author of the multi-media presentation. These factors include, but are not limited to the items noted herein.

One metric of user likelihood of requesting access to a specific page of the multi-media presentation is the number of times that the user has already viewed this page. Another factor is the distance, in number of successive pages of the multi-media presentation, between the present page and the identified page. This distance is measured in terms on the seriatim number of pages required to traverse this distance or is measured in terms of the number of paths that are taken to traverse the presentation from the present page to the identified page, and the distance of each of these paths. The caching is also impacted by the page dimensions, and page content which reflect the amount of data which must be transmitted to the user's processor for caching. Other significant considerations in the weighting of factors are the speed of operation of the user's processor, the amount of memory available for caching, and the length of time that the user spends viewing the individual pages of the multi-media presentation. Thus, these various factors are individually measured and their impact quantified via the assignment of weights to these factors to determine the amount of data precached in the user's processor during the transmission of the multi-media presentation.

Process For Presentation Export—Export Handlers

Figure 4:
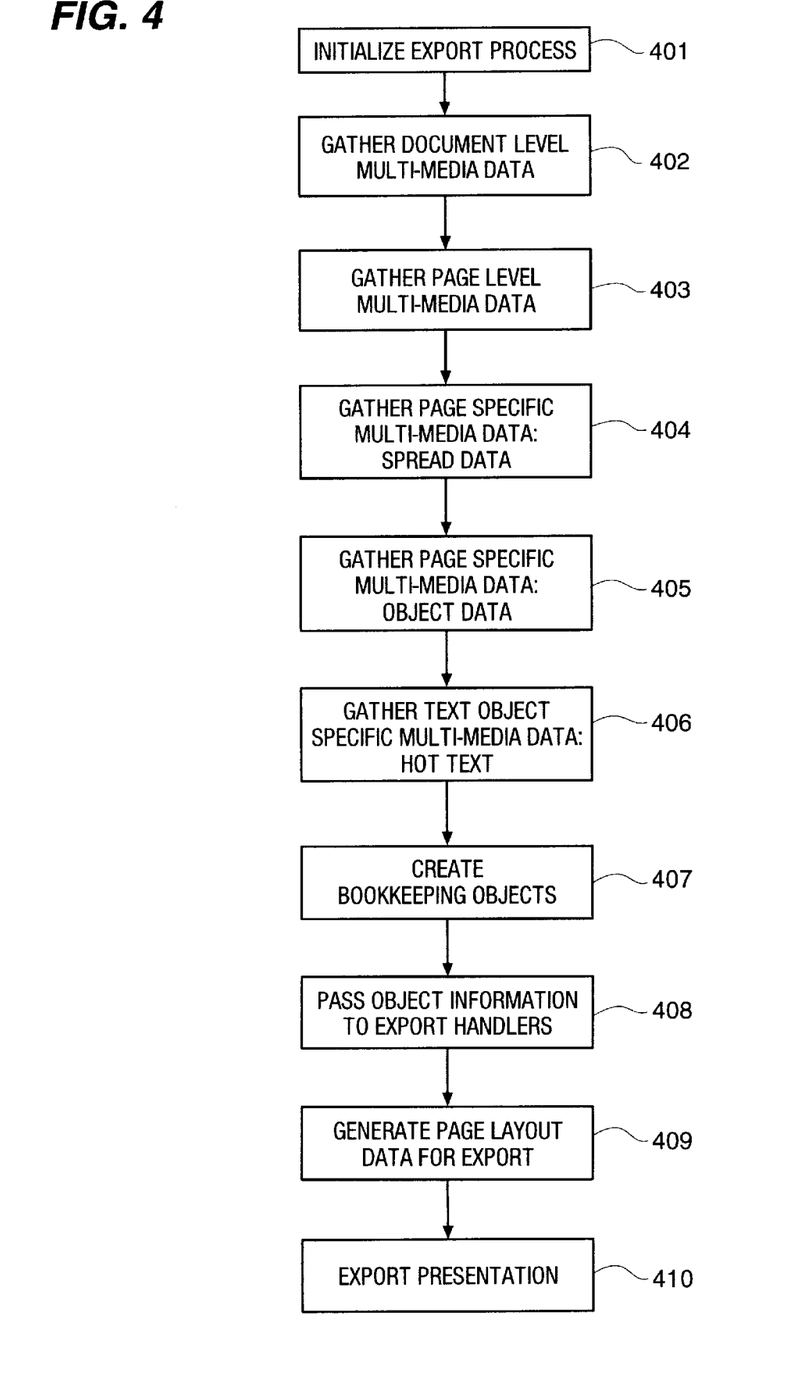
FIG. 4 illustrates, in flow diagram form, the process used by the multi-media presentation generation system to export a multi-media presentation.

The steps taken by the multi-media presentation generation system MPG to export a presentation is shown conceptually in flow diagram form in FIG. 4. In operation, the multi-media authoring tool A prepares to export a presentation by initializing the export process at step 401, which allocates sufficient memory to store the data required to export the presentation and places the page based document layout system Q into a known state to thereby obtain geometric information regarding the presentation. At step 402, the multi-media authoring tool A begins gathering information which characterizes the multi-media presentation by querying the page based document layout system Q to locate presentation based multi-media information which is needed to create an export object. Since the multi-media data is stored and processed by the page based document layout system Q in a transparent manner, the data is identified by tags which note the multi-media nature of the particular data object. Thus, the information located by the page based document layout system Q in step 402 comprise presentation level multi-media information, such as global keys, preference information and the like. At step 403, the multi-media authoring tool A progresses to the next level of presentation detail and begins gathering page based multi-media information which is needed to create an export object, such as page settings, page keys and the like. At step 404, the multi-media authoring tool A begins gathering page specific information, which characterizes each page of the multi-media presentation, by querying the page based document layout system Q to locate page specific multi-media information, such as spread based information which includes windows and the like. At step 405, the multi-media authoring tool A queries the page based document layout system Q to locate object based multi-media information contained on the presentation pages, which information includes movies, animations, pop-ups, text objects and the like. At step 406, the multi-media authoring tool A queries the page based document layout system Q to locate multi-media information which may be stored within a text story, such as hot text and the like. Finally, at step 407, the multi-media authoring tool A creates a set of bookkeeping objects which are used to manage the presentation that is to be displayed.

Once the object information is collected, the multi-media authoring tool A at step 408 prepares the retrieved objects for export by passing the object information to data/export handlers E, which are responsible for exporting instances of this object information. To improve the efficiency of this process, a plurality of export handlers E are implemented, each of which is designed to process a predetermined class of multi-media objects. Therefore, in performing this task, the export handlers E verify that the object information passed to this export handler E corresponds to the class of multi-media object which this export handler E is designed to process. If so, the export handler E creates an export object using the received object information, and identifies the ownership of this object (page, window, no ownership) by considering the geometry of the object. The geometry information is defined by the page based document layout system Q which functions to regulate the spatial relationships among the plurality of objects contained within the presentation. In addition, the export handler E sets the rasterization state of the export object to determine whether the export object is included in the background of the presentation or is included in the run-time display.

Once the export handlers E complete the export object generation, the multi-media presentation generation system MPG, at step 409, produces the page layout data for export, including the page geometry information generated by the page based document layout system Q, and the page display information created by the user via the multi-media authoring system A. The multi-media authoring system A also provides the page background image, which consists of a rasterized combination of all objects on the presentation page which were not tagged as being multi-media dynamic objects. This enables the static background to be efficiently stored in a format that is efficient to display, and avoids the necessity to recalculate the entire display as the dynamic objects resident on the page change in appearance and/or location. The multi-media presentation generation system MPG also generates object location data, which defines the object's locus on the presentation page, and stores the object location data in the corresponding object export file in a predetermined location for use by the presentation viewer V. At step 410, the multi-media presentation generation system MPG exports the presentation as a function of the destination media, with the data being filtered (sound) and compressed as a function of the type of export process selected by the user.

Data Compression

The data compression processes used herein comprises both image data compression and audio file compression. The timewise efficiency of the compression processes is not critical since the compression occurs in an off-line manner upon the completion of the presentation development. Therefore, the system uses nonsymmetric compression/decompression processes, with the decompression process being optimized for speed. In addition, the presentation is segmented into a plurality of objects and the compression effected for the various objects can vary, with specific data reduction strategies being implemented for each segment of page as a function of the data type as well as the storage/transmission medium. For example, sound is compressed to effect file size reduction. In addition, the system alters only file components not necessarily an entire file to achieve selective detuning.

Export Protocol

The multi-media presentation generation system MPG exports the presentation as a run time display which is not an editable object. The exported representation of the presentation is a function of the destination media, by automatically processing the presentation data in a manner that is adapted to efficiently disseminate the presentation in view of the limitations of the destination medium. Thus, where the presentation is exported as a single file for storage, such as to the hard drive of the processor, all of the external files used in the presentation are retrieved from their storage locations and placed at the beginning of the export file. The multi-media presentation generation system MPG then inserts, on a page by page basis, all of the data relating to each sequential page, including the page background image. Finally, if the export requires the insertion of a multi-media presentation viewer V, this file is added to the export. In the instance where the presentation is exported to a CD-ROM storage media, the presentation is divided into two files: a main file and an external file. The main file comprises the data relating to the geometry and behavior of objects on all pages of the presentation. In addition, any external files used on the first page of the presentation are stored in the main file to speed up the display of the first page of the presentation to the user. Finally, the multi-media viewer V, if needed, is also stored in the main file. Thus, the main file contains all of the presentation control information, while the external file contains all of the image data, such as the background images for the presentation pages as well as the external files used on all of the pages other than the first page.

The remaining destination comprises a transmission and presentation medium, such as Internet, where the medium is bandwidth limited and the time required to transmit the data necessary to generate the multi-media presentation to the user becomes a significant concern. The presentation is divided into at least two files: a main file and one or more external export files. The main file comprises the data relating to the geometry and behavior of objects on all pages of the presentation. In addition, the first page background information and any external files used on the first page of the presentation are stored in the main file to speed up the display of the first page of the presentation to the user. The remaining files, used on pages other than the first page are stored in various external export files. The presentation information is grouped primarily based on size of the file and likelihood of approximate accesses. Thus, the information required to create a specific page of the presentation is likely to be placed in a single external export file or a set of closely grouped external export files. The external export files typically contain a plurality of export objects and associated information, with the external export files representing the decomposition of a presentation page into increments which are separately transmitted to the end user over the communication medium in a timewise efficient manner, yet also does not require the transfer of too many files.

Multi-Media Viewer

The data which comprises a presentation created by the author using the multi-media authoring tool A must be retrieved from the presentation files and transmitted to the display device which the user has available to access the presentation. To accomplish this display process, a viewer process V is either available to the user separate from the accessing of the presentation, or it is embedded in the presentation or downloaded concurrently therewith. The viewer V runs the presentation and produces an output specific to the platform that the user is running on their processor. The viewer V uses standard platform definitions of windows and objects to couple the output of the presentation to the existing display constructs extant on the user's system.

Activation of the Presentation

The above description illustrates the creation and export of the multi-media presentation using the multi-media authoring tool A. To view the created presentation at the processor P, the user at step 504, in the process illustrated in FIG. 5, activates the presentation mode, which at step 505 retrieves the data necessary to create the presentation. The retrieved data enables the multi-media viewer V at step 506 to create the initial display, which includes checking the properties of the various display elements, such as the on/off state of buttons, the starting position of animation elements, and the like. The initial display is drawn on an incremental basis, with the data being retrieved as needed to create the displays. The data is typically compressed and is stored in a manner to enable incremental retrieval, such as by segment for a multi-segment display. An example of a display item is the animation element shown on FIG. 2. The retrieved data includes not only the image drawn in the animation object AB, but also a definition of the path PATH, the path length PL, the two terminus points of the path IP and TP, the direction of motion of the animation object AB, its speed of motion, and starting point. The creation of the display which represents the animation object AB requires the storage and retrieval of multiple images. Thus, an initial image is displayed in animation object AB, with additional image elements being added as time progresses. The multi-media viewer V must then retrieve data which defines the additional image elements.

The multi-media presentation is interactive, in that at step 507 the user provides a stimulus using one of the input devices to activate a selection which is presented on the display. In response to the user input, the multi-media viewer V at step 508 converts the user input into control signals which are used to engage one of the options which are embedded in the multi-media presentation.

Summary

The multi-media presentation generation system uses a page based document layout system, having a menu driven user interface, to combine media objects of multiple diverse types into an integrated multi-media presentation. The resultant multi-media presentation is defined in an output-independent format, and the multi-media presentation generation system automatically converts the multi-media presentation to a format that is optimized for the destination storage/presentation medium selected by the author. The page based document layout system partitions a multi-media presentation page, as defined by the author, into a plurality of objects, each of which is independently editable by the author. A multi-media authoring tool extends the capabilities of the page based document layout system to enable an author to merge both static and dynamic objects in a page layout environment to create the multi-media presentation.

We claim:

1. A method for enabling an author to generate a multi-media document capable of being rendered as a multi-media display on a display device, comprising the steps of:

producing a page layout for a document page of said multi-media document using a page based print document layout paradigm to regulate the spatial relationships among the plurality of objects contained within a multi-media presentation, said document page capable of being rendered as a multi-media display on a display device, said page layout comprising a plurality of objects, each object being independently editable and having a plurality of characteristics which define a content of an image created from said object and a locus of said image created from said object on said multi-media display;

defining at least one dynamic object, comprising a multi-media component of said multi-media document, for inclusion in said document page, comprising:
identifying a dynamic object,
presenting a set of dynamic object characteristics to an author for said identified dynamic object,
associating, in response to said author selecting ones of said dynamic object characteristics for said identified dynamic object, said selected dynamic object characteristics with said identified dynamic object; and integrating said at least one dynamic object with said document page of said multi-media document.

2. The method of claim 1 further comprising the steps of:
defining a static image for inclusion in said document page, wherein at least two of said objects on said page layout define images which are static in content, comprising:
identifying each of said at least two static objects;
rasterizing each said identified static object; and
combining said rasterized identified static objects into a rasterized static image.

3. The method of claim 2 further comprising the steps of:
rasterizing said at least one dynamic object; and
wherein said step of integrating combines said rasterized at least one dynamic object with said rasterized static image to create said multi-media display.

4. The method of claim 3 further comprising the step of:
transmitting said plurality of objects which comprise said document page to a destination via a communication medium.

5. The method of claim 4 further comprising the step of:
activating a viewer, executable at said destination, for executing said document page transmitted via said communication medium to said destination to create said multi-media display on a display device which is located at said destination.

6. The method of claim 5 wherein said viewer implements the step of:
look ahead caching a plurality of said multi-media pages.

7. The method of claim 3 further comprising the step of:
processing said document page to form a non-editable image for presentation to a user on said display device.

8. The method of claim 7 further comprising the step of:
initiating a predefined action corresponding to a user-selectable locus on said non-editable image, said user-selectable locus being activatable by a user input device.

9. The method of claim 8 further comprising the step of:
translating, in response to a user selecting, via said user input device, a user-selectable locus on said image which is presented on said display device, said user initiated action corresponding to said user-selectable locus into presentation of said data forming a one of said dynamic objects.

10. The method of claim 1 wherein said step of defining dynamic objects comprise defining at least one of the class of elements which include, but are not limited to: background, image, rasterized text, movie, non-rasterized text, window, animation, path for animation, pop-up menus, lists, interactive controls.

11. The method of claim 1 wherein said step of presenting said set of dynamic object characteristics includes but is not limited to presenting: location, size, orientation, transformation, path and velocity of motion, color, content.

12. The method of claim 1 further comprising the step of:
controlling, in response to occurrence of a stimulus which corresponds to a definition of a stimulus in said dynamic object characteristics, behavior of said dynamic object.

13. The method of claim 12 wherein said step of controlling behavior of said dynamic object is operable in a multi-tasking mode, wherein multiple dynamic objects are concurrently running in said multi-media display.

14. The method of claim 12 wherein said step of controlling behavior of said dynamic object is operable to enable movement of any of said plurality of objects located on said document page.

15. The method of claim 1 further comprising the step of:
formatting said document page for export to a destination medium comprising a one of: CD ROM, hard drive, Internet, and the like; said exported document page being formatted to correspond to said destination medium.

16. The method of claim 1 further comprising the step of:
activating a viewer executing said document page to create said multi-media display on said display device.

17. A program storage device readable by a computer, tangibly embodying instructions executable by said computer to perform method steps for enabling an author to generate a multi-media document capable of being rendered as a multi-media display on a display device, comprising the steps of:

producing a page layout for a document page of said multi-media document using a page based print document layout paradigm to regulate the spatial relationships among the plurality of objects contained within a multi-media presentation, said document page capable of being rendered as a multi-media display on a display device, said page layout comprising a plurality of objects, each object being independently editable and having a plurality of characteristics which define a content of an image created from said object and a locus of said image created from said object on said multi-media display;

defining at least one dynamic object, comprising a multi-media component of said multi-media document, for inclusion in said document page, comprising:
identifying a dynamic object,
presenting a set of dynamic object characteristics to an author for said identified dynamic object,
associating, in response to said author selecting ones of said dynamic object characteristics for said identified dynamic object, said selected dynamic object characteristics with said identified dynamic object; and integrating said at least one dynamic object with said document page of said multi-media document.

18. The program storage device of claim 17 further performing the step of:

defining a static image for inclusion in said document page, wherein at least two of said objects on said page layout define images which are static in content, comprising:
identifying each of said at least two static objects;
rasterizing each said identified static object; and
combining said rasterized identified static objects into a rasterized static image.

19. The program storage device of claim 18 further performing the step of:

rasterizing said at least one dynamic object; and
wherein said step of integrating combines said rasterized at least one dynamic object with said rasterized static image to create said multi-media display.

20. The program storage device of claim 19 further performing the step of:

transmitting said plurality of objects which comprise said document page to a destination via a communication medium.

21. The program storage device of claim 20 further performing the step of:

activating a multi-media viewer at said destination, for executing said document page transmitted via said communication medium to said destination to create said multi-media display on said display device which is located at said destination.

22. The program storage device of claim 21 wherein said viewer executes the step of:

look ahead caching a plurality of said multi-media pages.

23. The program storage device of claim 20 further performing the step of:

processing said document page to form a non-editable image for presentation to a user on said display device.

24. The program storage device of claim 23 further performing the step of:

initiating a predefined action corresponding to a user-selectable locus on said non-editable image, said user-selectable locus being activatable by a user input device.

25. The program storage device of claim 24 further performing the step of:

translating, in response to a user selecting, via said user input device, a user-selectable locus on said image which is presented on said display device, said user initiated action corresponding to said user-selectable locus into presentation of said data forming a one of said dynamic objects.

26. The program storage device of claim 20 wherein said step of rasterization is operable on objects which comprise at least one of the class of elements which include, but are not limited to: background, image, rasterized text, movie preview, non-rasterized text, window, animation, path for animation, pop-up menus, lists, interactive controls.

27. The program storage device of claim 17 wherein said step of presenting generates a menu which includes a set of dynamic object characteristics which include but are not limited to: location, size, orientation, transformation, path and velocity of motion, color, content.

28. The program storage device of claim 20 further performing the step of:

controlling, in response to occurrence of a stimulus which corresponds to a definition of a stimulus in said dynamic object characteristics, behavior of said dynamic object.

29. The program storage device of claim 28 wherein said step of controlling behavior of said dynamic object is operable in a multi-tasking mode, wherein multiple dynamic objects are concurrently running in said multi-media display.

30. The program storage device of claim 28 wherein said step of controlling behavior of said dynamic object is operable to enable movement of any of said plurality of objects located on said document page.

31. The program storage device of claim 17 further performing the step of:

formatting said document page for export to a destination medium comprising a one of: CD ROM, hard drive, Internet, and the like; said exported document page being formatted to correspond to said destination medium.

32. The program storage device of claim 17 further performing the step of:

activating a multi-media viewer for executing said document page to create said multi-media display on said display device.

* * * * *